(No Model.)
O. O. MARTINELL.
MUSIC LEAF TURNER.
No. 496,166. Patented Apr. 25, 1893.
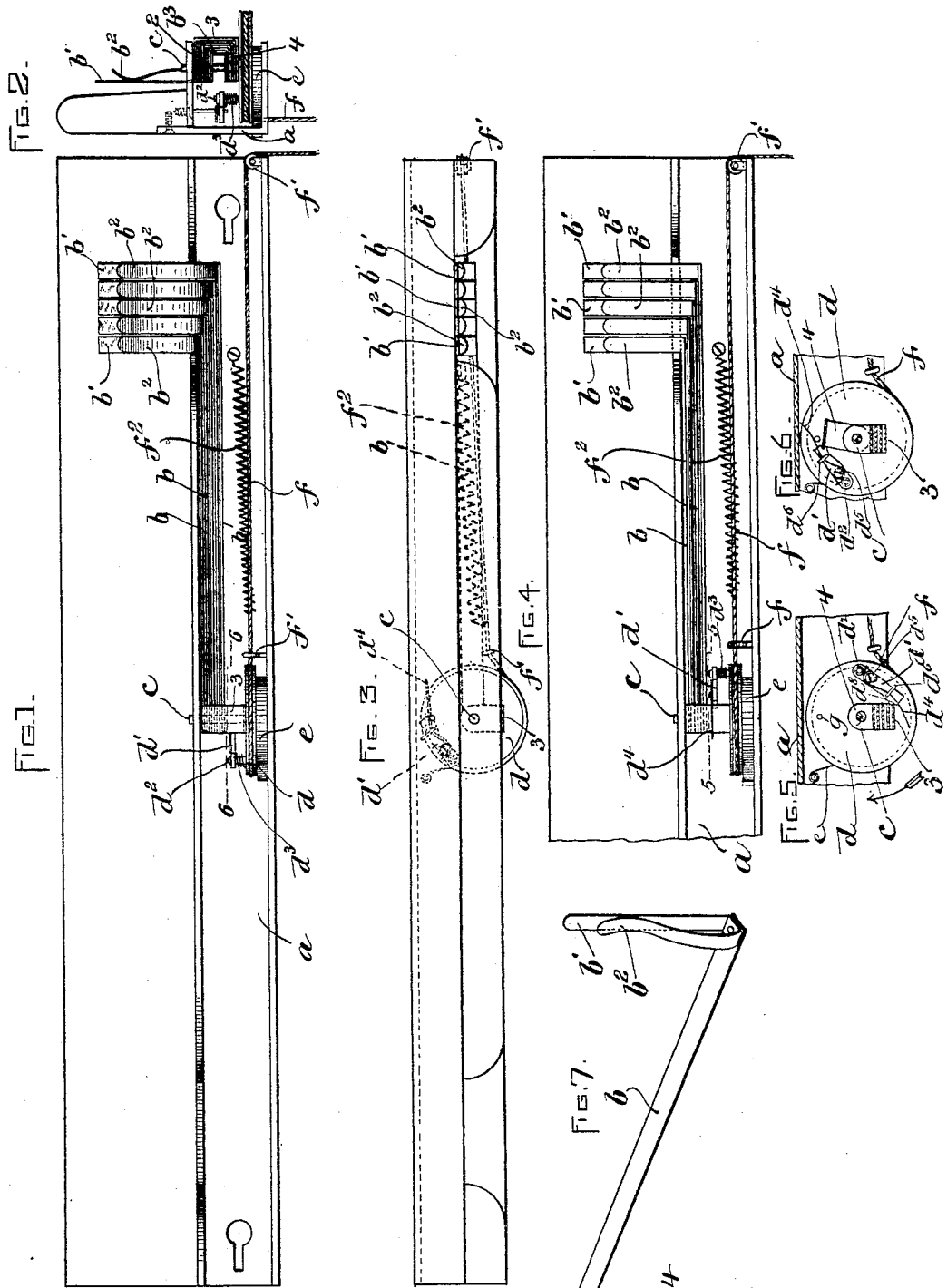
WITNESSES:
A. D. Harrison
W. S. McLeod
INVENTOR:
O. O. Martinell
by
Wight Brown Crosley
Atty.

UNITED STATES PATENT OFFICE.

OLOF O. MARTINELL, OF WALTHAM, MASSACHUSETTS.

MUSIC-LEAF TURNER.

SPECIFICATION forming part of Letters Patent No. 496,166, dated April 25, 1893.

Application filed January 23, 1893. Serial No. 459,382. (No model.)

*To all whom it may concern:*

Be it known that I, OLOF O. MARTINELL, of Waltham, in the county of Middlesex and State of Massachusetts, have invented certain new and useful Improvements in Music-Leaf Turners, of which the following is a specification.

This invention relates to means for enabling a performer at a piano or other instrument to turn the leaves of the piece of music being performed without using the hands, and it consists in the improved mechanism which I will now proceed to describe and claim.

Of the accompanying drawings, forming part of this specification: Figure 1 represents a front elevation of my improved music-leaf turner, the leaf-turning arms being in the position they occupy before the leaves are turned. Fig. 2 represents an end view of the same. Fig. 3 represents a top view. Fig. 4 represents a front view, showing the apparatus in readiness for turning a leaf. Fig. 5 represents a section on line 5—5, Fig 4. Fig. 6 represents a section on line 6—6, Fig. 1. Fig. 7 represents a perspective view of one of the leaf-turning arms and the fingers connected therewith.

In carrying out my invention, I connect to a suitable support $a$ a series of arms $b$, said arms being adapted to swing upon a stud or pivot $c$, mounted upon said support. There are as many arms $b$ as there are leaves to be turned, and each arm is adapted to swing independently upon the pivot $c$. Each arm is provided at its outer end with a leaf-engaging device, which, as here shown, comprises two spring fingers $b'$ $b^2$, adapted to yieldingly grasp a leaf between them. The inner end of each arm is provided with an outwardly-projecting finger $b^3$, said finger being preferably of the bent form shown in Fig. 7, and comprising the three parts 2, 3 and 4 shown in said figure, the part 4 being perforated to receive the pivot $c$, which pivot also passes through the inner end of the arm $b$. The fingers $b^3$ of the different arms $b$ are formed to be nested, the finger of the upper arm being the largest, and those of the other arms successively decreasing in size, so that the arms can be compactly contained one within another, as clearly shown in Figs. 2, 5 and 6.

$d$ represents a pulley, which is or may be affixed to the pivot $c$, and is arranged to support the series of arms, the lower portion 4 of the finger of the upper arm resting upon the upper surface of the pulley. The pulley $d$ is provided with a dog $d'$, which is mounted to swing upon a stud $d^2$ affixed to the pulley, and is pressed normally inward toward the pivot $c$, by means of a spring $d^3$ on said stud, the dog being adapted to engage the vertical portion 3 of each finger $b^3$ in succession, so that, when the pulley $d$ is in the position shown in Fig. 5, and is partially rotated in the direction indicated by the arrow in said figure, the dog will be caused by the spring $d^3$ to engage the outer finger $b^3$ and thus cause a leaf-turning movement of the arm on which said finger is formed, as presently described. The dog $d$ is provided with a guard $d^4$, which is preferably a piece of resilient wire, secured at one end to the dog by means of a screw or stud $d^5$, its free end projecting outwardly beyond the free end of the dog and being held by a guide or eye $d^6$, in such position that, when the dog, in moving backwardly or in the direction opposite that indicated in Fig. 5, and passes over the outer finger $b^3$ and springs inwardly to engage one edge of said finger, the guard $d^4$ will strike the outer surface of the finger, and prevent the dog from springing inwardly far enough to engage more than one finger.

$e$ represents an involute helical spring, one end of which is attached to the support $a$ and the other to the shaft or pivot $c$ to which the pulley is affixed, said spring acting to turn the pulley in the direction indicated by the arrow in Fig. 5.

$f$ represents a cord, attached to the periphery of the pulley and extending through suitable guides $f'$ $f'$ on the support $a$ to a point where it can be conveniently manipulated or moved by the operator. Said cord may, if desired, extend downwardly to a treadle (not shown), within reach of the operator's foot, the object of the cord being to enable the operator to partially rotate the pulley in the direction opposite that indicated by the arrow in Fig. 5, and thus carry the dog $d'$ from the position shown in Figs. 3 and 6 to that shown in Figs. 4 and 5.

In operating the described leaf-turning device, the arms $b$ are set in the position shown in Figs. 1, 2 and 3, and their leaf-engaging devices are engaged with the leaves to be turned, the pulley $d$ being held by its spring in the position shown in the same figures, so that its dog is out of engagement with either of the fingers $b^3$. When the operator desires to turn a leaf, the cord $f$ is pulled or moved in the direction required to rotate the pulley from the position shown in Figs. 1 and 2 to that shown in Fig. 5, this movement being against the pressure of the spring $e$. When the dog reaches the position shown in Fig. 5, its spring $d^3$ throws it inwardly into engagement with the outer finger $b^3$, the guard $d^4$ preventing its engagement with any excepting the outer finger, as already described. The cord $f$ being then released, the spring $d$ acts to return the pulley to the position shown in Figs. 1 and 2, thus causing the dog to swing the arm of the finger with which it is engaged through one-half of a complete rotation, so that the leaf engaged with said arm is properly turned. When the pulley has nearly reached the position shown in Figs. 1 and 2, the guard $d^4$ strikes a fixed stop or pin $g$, which is arranged to spring the guard outwardly. The dog is at this time prevented from being thrown outwardly by its engagement with the finger, said dog being notched at $d^8$ in such manner as to positively engage each finger. The dog may be disengaged from the finger by a slight pull on the cord, the dog being thus slightly retracted from the finger so that the tension on the spring guard $d^4$ will throw the dog outwardly. It will be seen therefore that each arm and the leaf engaged therewith is securely held after the leaf has been turned until the operator releases said arm by a movement of the cord. After the arm has been released it may be swung backwardly without interference with the dog.

It will be seen that the described mechanism is very simple and effective, and is not liable to get out of order.

To prevent liability of the cord $f$ becoming disengaged from the periphery of the pulley, which periphery is grooved to receive said cord, I provide a light spring $f^2$, attached at one end of the cord and at the other end to the support $a$, the spring being arranged to exert sufficient tension on the cord to hold it in engagement with the grooved periphery of the pulley.

I claim—

1. In a music-leaf turner, the combination of a series of pivoted arms, each provided with a leaf-holding device at its outer end and with a projecting finger at its inner end; a pulley having a spring dog adapted to engage said fingers successively, said dog having a guard whereby it is prevented from engaging more than one finger at a time; a spring arranged to turn the pulley in one direction, and thereby cause the dog to impart a leaf-turning movement to the arm with which it is engaged; and a device controlled by the operator for turning the pulley in the opposite direction back to its starting-point; as set forth.

2. In a music-leaf turner, the combination of a series of pivoted arms having leaf-engaging devices at their outer ends, and projecting fingers at their inner ends; a pulley having a spring dog adapted to engage said fingers successively, said dog having a projecting resilient guard; a spring arranged to turn the pulley in one direction, and thereby cause the dog to impart a leaf-turning movement to the arm with which it is engaged; a fixed stop arranged to engage said guard and put the same under tension preparatory to disengaging the dog from each finger after the leaf-turning movement of the arm to which it is attached; and means for turning the pulley in the opposite direction; as set forth.

In testimony whereof I have signed my name to this specification, in the presence of two subscribing witnesses, this 19th day of January, A. D. 1893.

OLOF O. MARTINELL.

Witnesses:
J. ERIK LUNGREN,
WILH. ERIKSON.